United States Patent
Shibata et al.

(10) Patent No.: US 8,538,646 B2
(45) Date of Patent: Sep. 17, 2013

(54) CONTROL DEVICE FOR VEHICULAR AUTOMATIC TRANSMISSION

(75) Inventors: Tetsuro Shibata, Toyota (JP); Hideaki Otsubo, Aichi-ken (JP); Toshiya Oishi, Toyota (JP); Kiyoshi Kobayashi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1512 days.

(21) Appl. No.: 12/128,401

(22) Filed: May 28, 2008

(65) Prior Publication Data
US 2008/0300106 A1 Dec. 4, 2008

(30) Foreign Application Priority Data
May 29, 2007 (JP) .................................. 2007-142495

(51) Int. Cl.
*F16H 61/14* (2006.01)
*G06F 17/00* (2006.01)

(52) U.S. Cl.
USPC .............................. 701/58; 477/149; 477/156

(58) Field of Classification Search
USPC ................. 701/51, 54, 58, 60, 64, 66, 67, 68;
477/102, 104, 143, 144, 148, 149, 156
See application file for complete search history.

(56) References Cited

U.S. PATENT DOCUMENTS

| | | | |
|---|---|---|---|
| 6,761,664 B2 | 7/2004 | Ayabe et al. | |
| 2004/0158382 A1* | 8/2004 | Furuichi et al. | 701/51 |
| 2005/0071069 A1* | 3/2005 | Mori | 701/54 |

FOREIGN PATENT DOCUMENTS

| | | |
|---|---|---|
| JP | 7-81631 | 9/1995 |
| JP | 10-331962 | 12/1998 |
| JP | 2001-214771 | 8/2001 |
| JP | 2003-42282 | 2/2003 |
| JP | 2004-257297 | 9/2004 |

* cited by examiner

*Primary Examiner* — Thomas Tarcza
*Assistant Examiner* — Edward Pipala
(74) *Attorney, Agent, or Firm* — Oblon, Spivak, McClelland, Maier & Neustadt, L.L.P.

(57) ABSTRACT

A control device for a vehicular automatic transmission is provided which can preferably execute backpressure control of accumulators and torque-up control so as to minimize the occurrence of interference between learning on these controls during a gearshift operation. With the control device for the vehicular automatic transmission including the accumulators (104, 106 and 108) operative to control a hydraulic pressure supplied to second and third clutches (C2 and C3) and a third brake (B3), the backpressure control is executed for controlling a backpressure of the accumulators (104, 106 and 108) during the gearshift operation while the torque-up control is executed for raising torque output from an engine (12). Completion of learning on the backpressure control is determined when no completion of learning on the backpressure control is determined, learning on the backpressure control is executed with no execution of the torque-up control. Thus, no interference occur between learning on the backpressure control and the torque-up control.

10 Claims, 10 Drawing Sheets

FIG.2

|  | C1 | C2 | C3 | C4 | B1 | B2 | B3 | B4 | F0 | F1 | F2 | F3 |
|---|---|---|---|---|---|---|---|---|---|---|---|---|
| Rev |  |  | ○ |  | ○ |  | ○ |  | ○ |  |  |  |
| N |  |  |  |  |  |  |  |  |  |  |  |  |
| 1st | ○ |  |  | ○ |  |  |  | △ | ○ |  |  | ○ |
| 2nd | ○ |  |  | ○ |  | △ | ○ |  | ○ | ○ | ○ |  |
| 3rd | ○ |  | ○ | ○ | △ |  | ○ |  | ○ | ○ |  |  |
| 4th | ○ | ○ | ○ | ○ |  |  | ○ |  | ○ |  |  |  |
| 5th | ○ | ○ | ○ |  | ○ |  | ○ |  |  |  |  |  |
| 6th | ○ | ○ |  |  | ○ | ○ | ○ |  |  |  |  |  |

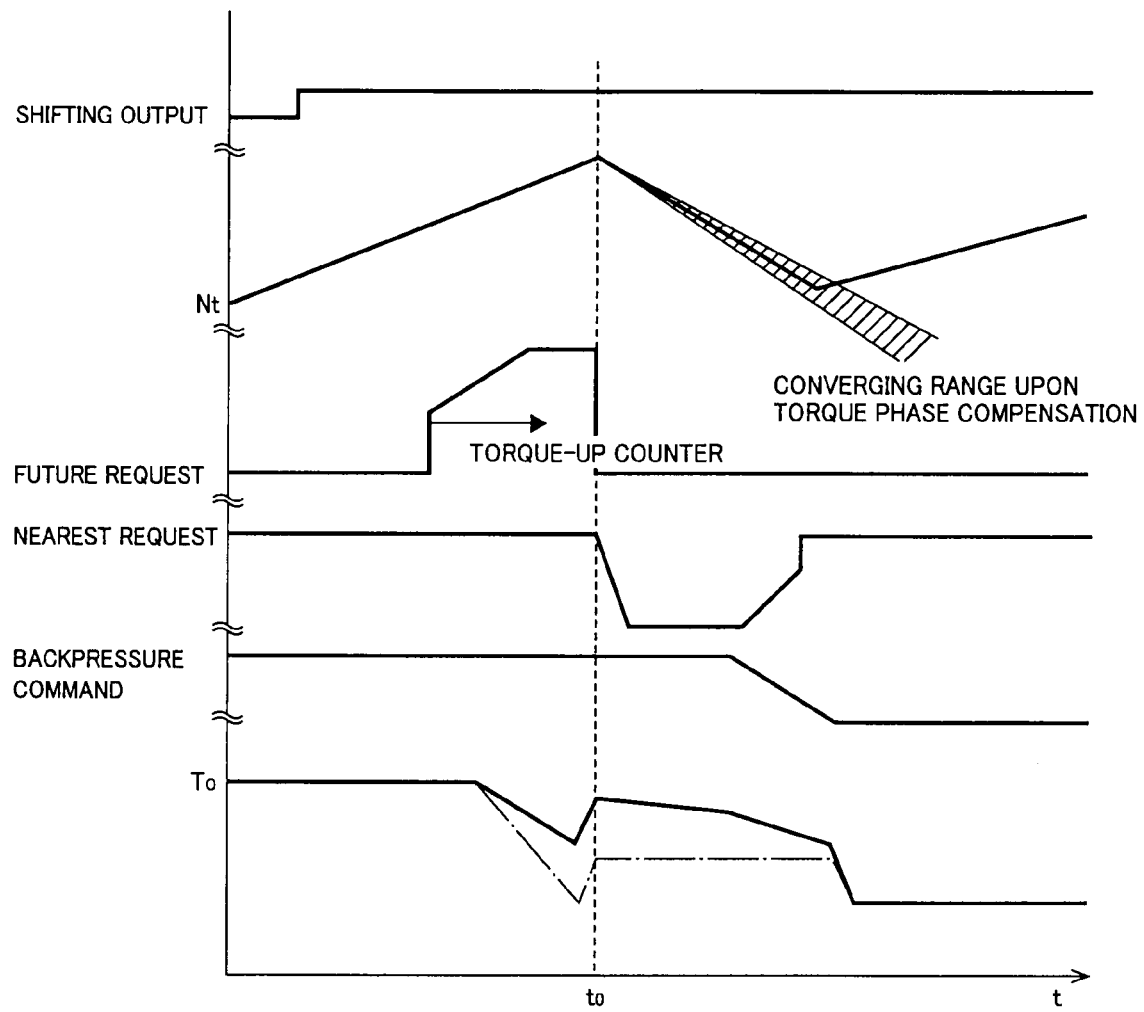

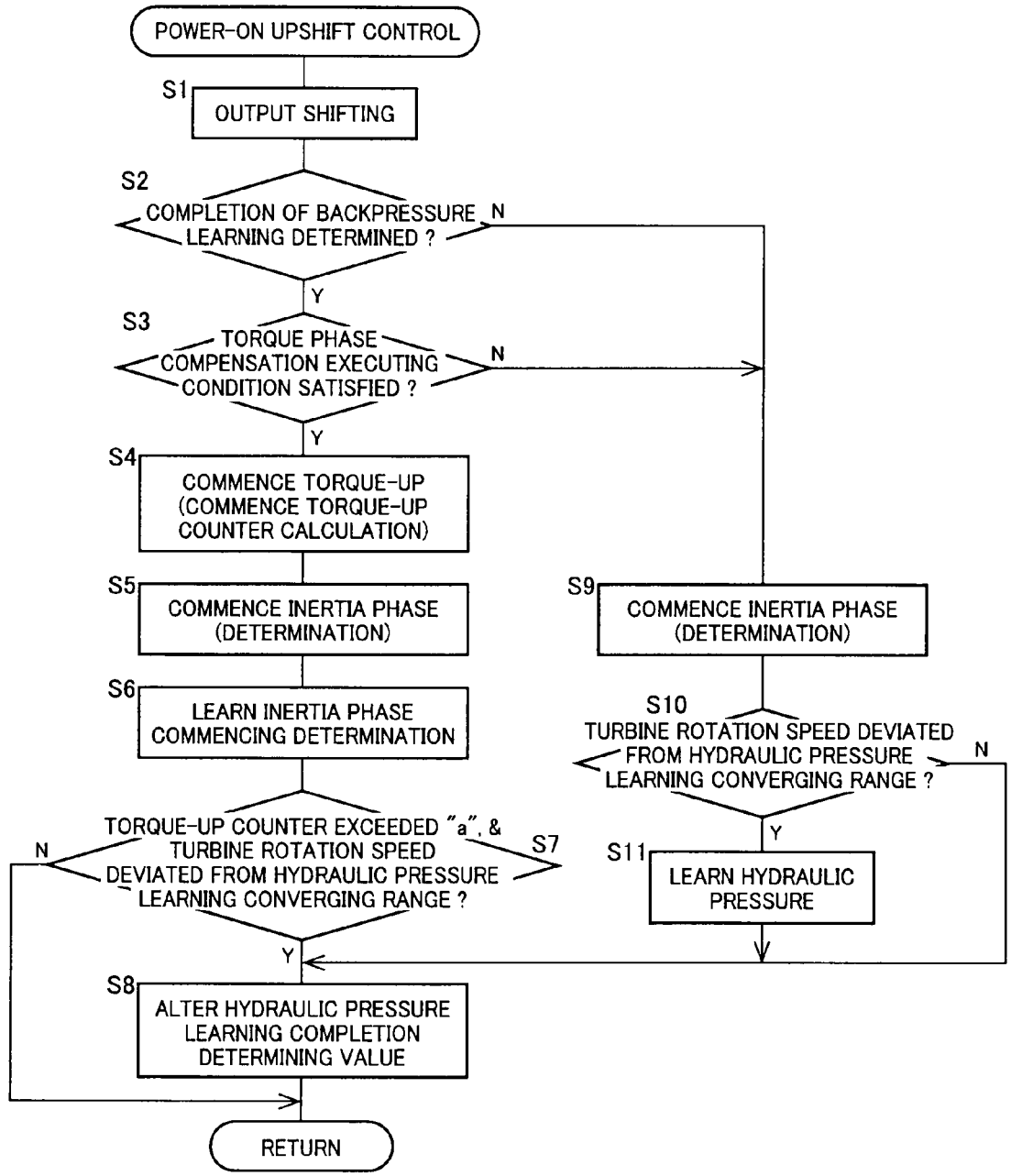

CONTROL DEVICE FOR VEHICULAR AUTOMATIC TRANSMISSION

BACKGROUND OF THE INVENTION

1. Field of the Invention

This invention relates to a control device for vehicular automatic transmission to execute a backpressure control to control a backpressure of accumulators while executing a torque-up control for raising output torque of a drive force source. More particularly, it relates to a technology of suppressing the occurrence of interference between learning on such controls.

2. Description of the Related Art

There has heretofore been known a vehicular automatic transmission having hydraulically operated frictional engaging devices whose engaging states are controlled with a hydraulic pressure, and accumulators (pressure accumulators) for controlling the hydraulic pressure being supplied to the hydraulically operated frictional engaging devices. With such an automatic transmission, a gearshift operation is executed during which a backpressure of the accumulators is controlled for controlling the engaging states of the hydraulically operated frictional engaging devices depending on the associated backpressure. It has been often difficult to estimate actual engaging pressures of the hydraulically operated frictional engaging devices depending on the backpressure of the accumulators.

With such an automatic transmission, there has been known a technology of effectuating a torque-up control for minimizing pull-in of a torque phase occurring during the gearshift operation. For instance, such a technology is disclosed in Patent Publication 1 (Japanese Patent Application Publication No. 2001-214771) related to a throttle control device for internal combustion engine.

With such a technology, torque phase detecting means actually detects a beginning time and an ending time of a torque phase during a shift-up mode for controlling a throttle valve opening so as to increase torque, output from a drive-force source, in the presence of the torque phase. This control is executed based on the beginning time and ending time of the torque phase detected by the torque phase detecting means. This accurately results in coincidence between a period in which torque output from the drive-force source increases, and a period in which the torque phase is generated, appropriately enabling the suppression of a shifting shock encountered in the shift-up mode.

Another technique disclosed in the Patent Publication 2 (Japanese Patent Application Publication No. 10-331962) and the Patent Publication 3 (Japanese Patent Application Publication No. 2004-257197) has been known.

In order to appropriately execute the torque-up control set forth above, meanwhile, a need arises for performing learning on timing at which the torque-up control is commenced, and learning on the backpressure of accumulators in the presence of a gearshift operation. However, with such a technology of the related art, defect of a difficulty of appropriately performing a learning step may occur due to interference between the steps of learning simultaneously executed. Therefore, research and development work has been required to provide a control device for a vehicular automatic transmission that can cancel interference between learning on the backpressure of the accumulators and leaning on the torque-up control during the gearshift operation.

SUMMARY OF THE INVENTION

The present invention has been completed with the above views in mind, and has an object to provide a control device for a vehicular automatic transmission that can minimize interference between learning on a backpressure control of accumulators and leaning on a torque-up control during a gearshift operation for thereby appropriately executing those controls.

For achieving the above object, the vehicular automatic transmission comprises hydraulically operated frictional engaging devices whose engaging states are controlled with a hydraulic pressure, and accumulators for controlling the hydraulic pressure supplied to the hydraulically operated frictional engaging devices, during a gearshift operation, a backpressure control being executed for controlling a backpressure of the accumulators and a torque-up control being executed for raising a torque output from a drive-force source.

The control device determines whether or not learning on the backpressure control is completed, and when no completion of learning on the backpressure control is determined, executes learning on the backpressure control with no execution of the torque-up control.

The vehicular automatic transmission comprises the hydraulically operated frictional engaging devices whose engaging states are controlled with the hydraulic pressure, and the accumulators for controlling the hydraulic pressure supplied to the hydraulically operated frictional engaging devices. During the gearshift operation, the backpressure control is executed for controlling the backpressure of the accumulators, and the torque-up control is executed for raising torque output from the drive-force source.

With such a structure, the determination is made whether or not learning on the backpressure control is completed. If no completion of learning on the backpressure control is determined, then, learning on the backpressure control is executed with no execution of the torque-up control. This allows learning on the backpressure control to be executed in priority during the gearshift operation, thereby avoiding interference between the steps of learning. Thus, the control device for the vehicular automatic transmission can be provided, which can minimize interference between learning on the backpressure control of the accumulators, and leaning on the torque-up control during the gearshift operation, for thereby appropriately executing those controls.

Preferably, if completion of learning on the backpressure control is determined, the torque-up control is executed by the control device with the execution of learning on the torque-up control. With such a control, if learning on the backpressure control is completed, both the torque-up control and related learning can be appropriately executed during the gearshift operation.

More preferably, during the gearshift operation with the torque-up control being executed, the determination is made whether or not learning on the backpressure control is completed by the control device. If no completion of learning on the backpressure control is determined, then, learning on the backpressure control is executed by the control device with no execution of the torque-up control.

With such an operation, even once the completion of learning on the backpressure control is determined, learning on the backpressure control is executed again by the control device, when learning on the backpressure control is inadequate with the progress of learning the torque-up control. Thus, the backpressure control and the torque-up control can be appropriately executed during the gearshift operation with no interference between the steps of learning Preferably, the control device determines completion of learning on the backpressure control, based on whether or not variation of a rotation speed of an input shaft of the automatic transmission converges within a predetermined range.

Preferably, the control device, upon a normal up-shift control, outputs an engine torque correction request for decreasing torque of the drive-force source. In addition, the control device, upon a normal up-shift control, executes learning on backpressure of the accumulator.

Preferably, the control device increases or decreases backpressure of the accumulator depending on weather a rotation speed of an input shaft of the automatic transmission is lower or higher than a predetermined range. In addition, the control device, upon execution of torque up after completion of the backpressure control learning, outputs engine torque correction request for temporarily increasing torque of the drive source. Further, the control device, upon execution of torque up after completion of the backpressure control learning, executes learning on a start timing of the torque-up control.

Preferably, the control device includes a backpressure controlling portion controlling backpressure of the accumulator, a backpressure learning portion executing learning on the backpressure by the backpressure controlling portion, a torque phase compensation controlling portion executing the torque-up control for increasing torque of the drive source upon up-shifting by the automatic transmission, and a timing learning portion executing a torque phase compensation control by the torque phase compensation controlling portion.

BRIEF DESCRIPTION OF THE DRAWINGS

FIG. 2 is an engagement operation diagram illustrating engaging operations of clutches and brakes to establish respective gearshift positions in an automatic transmission incorporated in the drive-force transfer device.

FIG. 10 is a timing chart exemplarily showing variation in times of various related values when performing the power-on upshift control in the automatic transmission shown in FIG. 1 with learning on backpressure control and torque phase compensation control being stabilized after completion therefor.

FIG. 11 is a flowchart illustrating one example of a power-on upshift control to be executed with the electronic control unit shown in FIG. 3.

DETAILED DESCRIPTION OF THE PREFERRED EMBODIMENTS

Now, a preferred embodiment according to the present invention will be described below with reference to the accompanying drawings.

<Embodiment>

Figure 1:
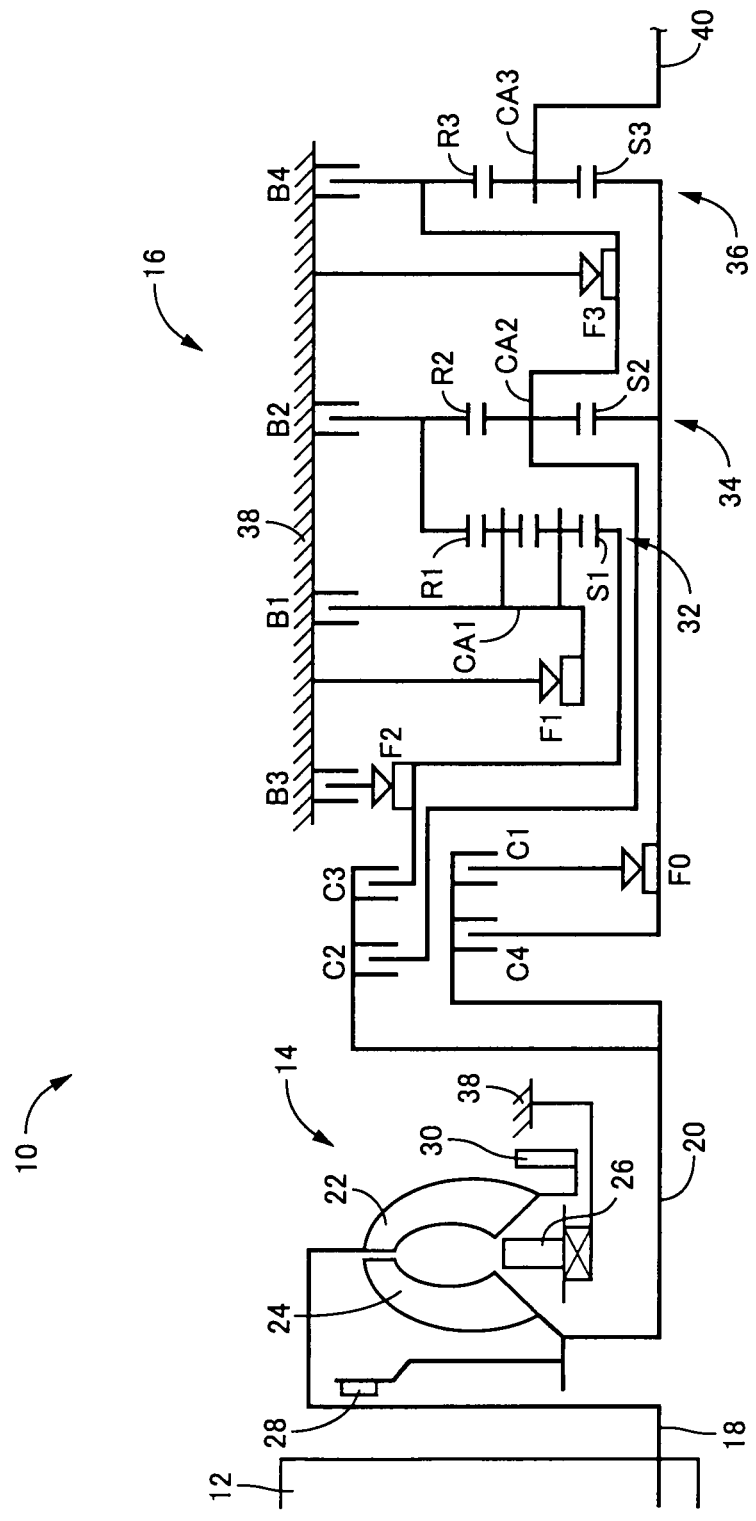
FIG. 1 is a skeleton view illustrating an overall structure of a drive-force transfer device to which the present invention is preferably applied.

FIG. 1 is a skeleton view illustrating an overall structure of a drive-force transfer device 10 to which the present invention is preferably applied. The drive-force transfer device 10 is disposed in a power transmitting path between an engine 12, acting as a running drive-force source, and drive wheels (not shown) to serve as a device to transfer a drive force, output from the engine 12, to the drive wheels at a speed ratio gear-shifted with an automatic transmission 16. The drive force (torque), output from the engine 12, is input to the automatic transmission 16 via a torque converter 14 and transferred to the drive wheels via a differential gear device and axles or the like, both not shown.

The engine 12 is, for instance, an internal combustion engine, such as a gasoline engine, which has cylinders to which fuel is injected for combustion to generate a drive force. Further, the torque converter 14 includes a bladed fluid impeller 22 connected to a crankshaft 18 of the engine 12, a bladed turbine 24 connected to an input shaft 20 of the automatic transmission 16, and a bladed stator 26 having a one-way clutch adapted to block the rotation of the bladed stator 16 in one way with respect to a housing 38 of the automatic transmission 16. Thus, the torque converter 14 acts as a fluid type power transfer device for initiating a power transfer between the bladed impeller 22 and the bladed turbine 24 via a flow of hydraulic fluid. Furthermore, a lockup clutch 28 is interposed between the bladed impeller 22 and the bladed turbine 24 to interconnect them to each other. In addition, the bladed impeller 22 includes a mechanical type hydraulic pump 30 that produces a hydraulic pressure for accomplishing a gearshift control of the automatic transmission 16 while supplying lubricating oil to various associated component parts.

The automatic transmission 16 includes a planetary gear type transmission having a first planetary gear unit 32 of a double pinion type, and second and third planetary gear units 34 and 36 of a single pinion type. A sun gear SI of the first planetary gear unit 32 is selectively connectable to the input shaft 20 via a third clutch C3, and also selectively connectable to the housing 38 via a one-way clutch F2 and a third brake B3 to be blocked in rotation in a direction opposite to that of the input shaft 20. In addition, a carrier CA1 of the first planetary gear unit 32 is selectively connectable to the housing 38 via a first brake B1 and a reverse rotation of the carrier CA1 is blocked at all times due to an action of a one-way clutch F1 disposed in parallel to the first brake B1.

The first planetary gear unit 32 has a ring gear R1, unitarily connected to a ring gear R2 of the second planetary gear unit 34, which is selectively connectable to the housing 38 via a second brake B2. Further, a sun gear S2 of the second planetary gear unit 34 is unitarily connected to a sun gear S3 of the third planetary gear unit 36 to be selectively connectable to the input shaft 20 via a fourth clutch C4. In addition, the sun gear S2 is selectively connectable to the input shaft 20 via a one-way clutch F0 and a first clutch C1 to be blocked in rotation in a direction opposite to that of the input shaft 20.

Further, the second planetary gear unit 34 has a carrier CA2, unitarily i.e. integrally connected to a ring gear R3 of the third planetary gear unit 36, which is selectively connectable to the input shaft 20 via a second clutch C2 and selectively connectable to the housing 38 via a fourth brake B4. A reverse rotation of the carrier CA2 is blocked at all times due to an action of a one-way clutch F4 disposed in parallel to the fourth brake B4. Moreover, the third planetary gear unit 36 has a carrier CA3 that is unitarily connected to an output shaft 40.

The first, second, third and fourth clutches C1, C2, C3 and C4, and the first, second, third and fourth brakes B1, B2, B3 and B4 (hereinafter merely referred to as a clutch C and a brake B unless otherwise indicated), incorporated in the automatic transmission 16, may be comprised of hydraulically operated frictional engaging devices, such as multiple type clutches, brakes or the like, which are controllably engageable with hydraulic actuators, respectively.

Figure 3:
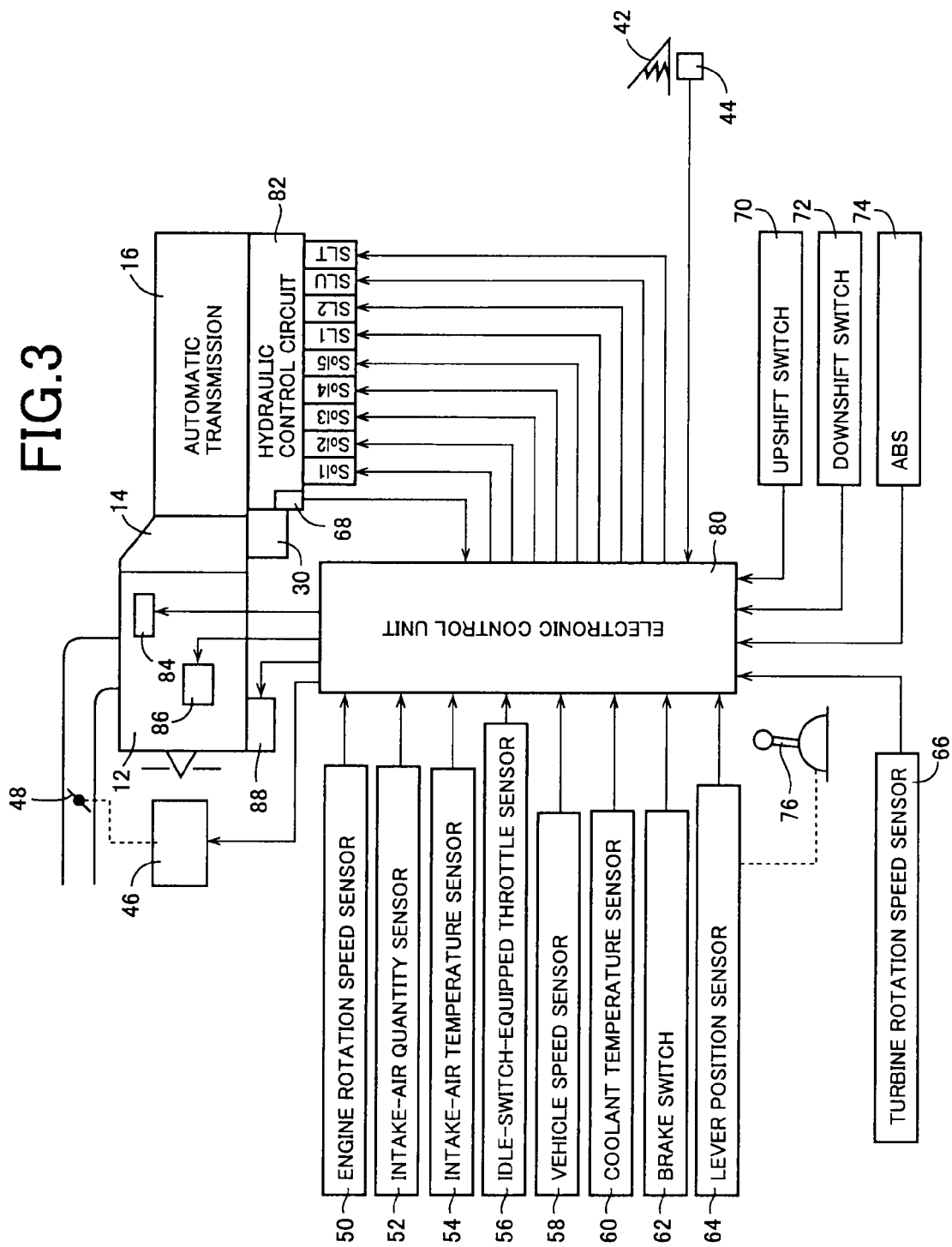
FIG. 3 is a block diagram illustrating a control system provided on a vehicle for controlling an engine and the automatic transmission or the like incorporated in the drive-force transfer device shown in FIG. 1.

As shown in FIG. 3, the drive-force transfer device 10 includes a hydraulic control device 82 that controls hydraulic pressure delivered to the clutch C and the brake B, respectively. Engaging states (coupling pressures) of the clutch C and the brake B are controlled depending on the hydraulic pressure delivered from the hydraulic control device 82. Thus, the drive-force transfer device 10 is arranged to cause the automatic transmission 16 to establish a gearshift position depending on how the clutch C and the brake B are caused to engage or disengage.

FIG. 2 is an engagement operation diagram for illustrating engaging operations of the clutch C and the brake B for the automatic transmission 16 to establish respective gear positions. A symbol "○" represents an engaging state and a blank represents a disengaging state with a symbol "Δ" represents the engaging state with engine braking effectuated. As shown in FIG. 2, the automatic transmission 16 establishes various gearshift positions involving: a first gear position "1st" with the first and fourth clutches C1 and C4 (in addition, the fourth brake B4 under the engine braking condition) being engaged; a second gear position "2nd" with the first clutch C1, the fourth clutch C4 and the third brake B3 (and, in addition, the second brake B2 under the engine braking condition) being engaged; and a third gear position "3rd" with the first clutch C1, the third clutch C3, the fourth clutch C4 and the third brake B3 (and, in addition, the first brake B1 under the engine braking condition) being engaged.

The various gearshift positions further involves: a fourth gear position "4th" with the first to the fourth clutches C1 to C4 and the third brake B3 being engaged; a fifth gear position "5th" with the first to the third clutches C1 to C3 and the first and third brakes B1 and B3 being engaged; and a sixth gear position "6th" with the first and second clutches C1 and C2 and the first to third brakes B1 to B3 being engaged. In addition, a reverse-drive gear position "Rev" is established with the third clutch C3 and the first and fourth brakes B1 and B4 being engaged and a neutral state is established with all of the clutches and the brakes B being disengaged.

FIG. 3 is a block diagram illustrating a control system incorporated in a vehicle for controlling the engine 12 and the automatic transmission 16 or the like. An electronic control unit 80, shown in FIG. 3, includes a so-called microcomputer having a CPU, a RAM, a ROM and input/output interfaces or the like. Upon utilizing a temporary storage function of the RAM while performing signal processing in accordance with programs preliminarily stored in the ROM, the electronic control unit 80 executes an output control of the engine 12 while executing a gearshift control of the automatic transmission 16 via the hydraulic control circuit 82.

With the drive-force transfer device 10, an accelerator-opening sensor 44 detects an accelerator-opening Acc representing a displacement value (depressing stroke) of an accelerator pedal 42 depressed in operation by a driver. Further, the engine 12 has an intake manifold incorporating therein an electronic throttle valve 48 operative to be controllably actuated with a throttle actuator 46 to control an idle rotation speed $N_{EIDL}$ of the engine 12 while establishing an opening angle, i.e., a throttle opening $\theta_{TH}$ depending on the accelerator-opening Acc.

Further, various sensors are provided including: an engine rotation speed sensor 50 for detecting a rotation speed $N_E$ of the engine 12; an intake-air quantity sensor 52 for detecting an intake-air quantity Q of the engine 12; an intake-air temperature sensor 54 for detecting an intake-air temperature $T_A$; an idle-switch-equipped throttle sensor 56 for detecting a fully-closed state (idling state) and the throttle opening $\theta_{TH}$ of the electronic throttle valve 48; a vehicle speed sensor 58 for detecting a vehicle speed V corresponding to a rotation speed $N_{OUT}$ of the output shaft 40; a coolant temperature sensor 60 for detecting an engine coolant temperature $T_W$ of the engine 12; a brake switch 62 for detecting the presence or absence of a foot brake (not shown) serving as a commonly used brake being under operation; and a lever position sensor 64 for detecting a lever position (shifted gear position) $P_{SH}$ of a shift lever 76.

Furthermore, various other sensors and switches are further provided including: a turbine rotation speed sensor 66 for detecting a turbine rotation speed $N_T$ corresponding to a rotation speed $N_{IN}$ of the input shaft 20; an AT oil temperature sensor 68 for detecting an AT oil temperature $T_{OIL}$ representing a temperature of working oil present in the hydraulic control circuit 82; an upshift switch 70; and a downshift switch 72 or the like. Thus, these sensors and switches provide the electronic control unit 80 with various signals representing the engine rotation speed $N_E$, the intake-air quantity Q, the intake-air temperature $T_A$, the throttle opening $\theta_{TH}$, the vehicle speed V, the engine coolant temperature $T_W$, the presence or absence of the braking operation, the lever position $P_{SH}$ of the shift lever 76, the turbine rotation speed $N_T$, the AT oil temperature $T_{OIL}$, and signals representing an upshift command $R_{UP}$ and a downshift command $R_{DN}$ in a gearshift range.

Further, the electronic control unit 80 is connected to an ABS (antilock braking system) 74 for controlling a brake force so as not to lock (slip) the drive wheels during the operation of the foot brake and supplied with information related to brake pressure or the like corresponding to the brake force.

The electronic control unit 80 performs the output control of the engine 12 depending on the accelerator-opening Acc, detected by the accelerator-opening sensor 44, i.e., the displacement value of the accelerator pedal 42. Such an output control is performed by, for instance, causing the throttle actuator 46 to controllably open or close the electronic throttle valve 48 such that the engine 12 provides an output depending on such an accelerator-opening Acc. Additionally, a fuel injection valve 84 is controlled for executing a fuel injection-rate control and controlling an ignition device 86, such as an igniter or the like, for performing an ignition timing control. In controlling the electronic throttle valve 48, the throttle actuator 48 is driven in response to an actual throttle opening Acc by referring to a predetermined relationship such that the greater the accelerator-opening Acc, the greater will be the throttle opening $\theta_{TH}$. In addition, during a startup of the engine 12, a starter (electric motor) 88 is driven to crank a crankshaft 18 of the engine 12.

Further, the electronic control unit 80 controls a gearshift operation of the automatic transmission 16 by the hydraulic control circuit 82. The hydraulic control circuit 82 includes solenoid valves Sol1 to Sol15 and linear solenoid valves SL1, SL2, SLU and SLT. The solenoid vales Sol1 to Sol15 and the linear solenoid valves SL1 and SL2 include electronic control valves, respectively, which are operative to be actuated with a line pressure $P_{L1}$ serving as an original hydraulic pressure. A primary regulator valve 92 provides such a line pressure $P_{L1}$ upon regulating the hydraulic pressure delivered from the hydraulic pump 30.

The solenoid vales Sol1 to Sol15 and the linear solenoid valves SL1 and SL2 are provided for performing the gearshift operation. The linear solenoid valve SLU is mainly involved in operations to engage or disengage the lockup clutch 28 and the linear solenoid valve SLT operates mainly for controlling the line pressure. In addition, the hydraulic control circuit 82 has working oil that is also supplied to the lockup clutch 28 and further used for lubricating various parts of the automatic transmission 16 or the like.

Figure 4:
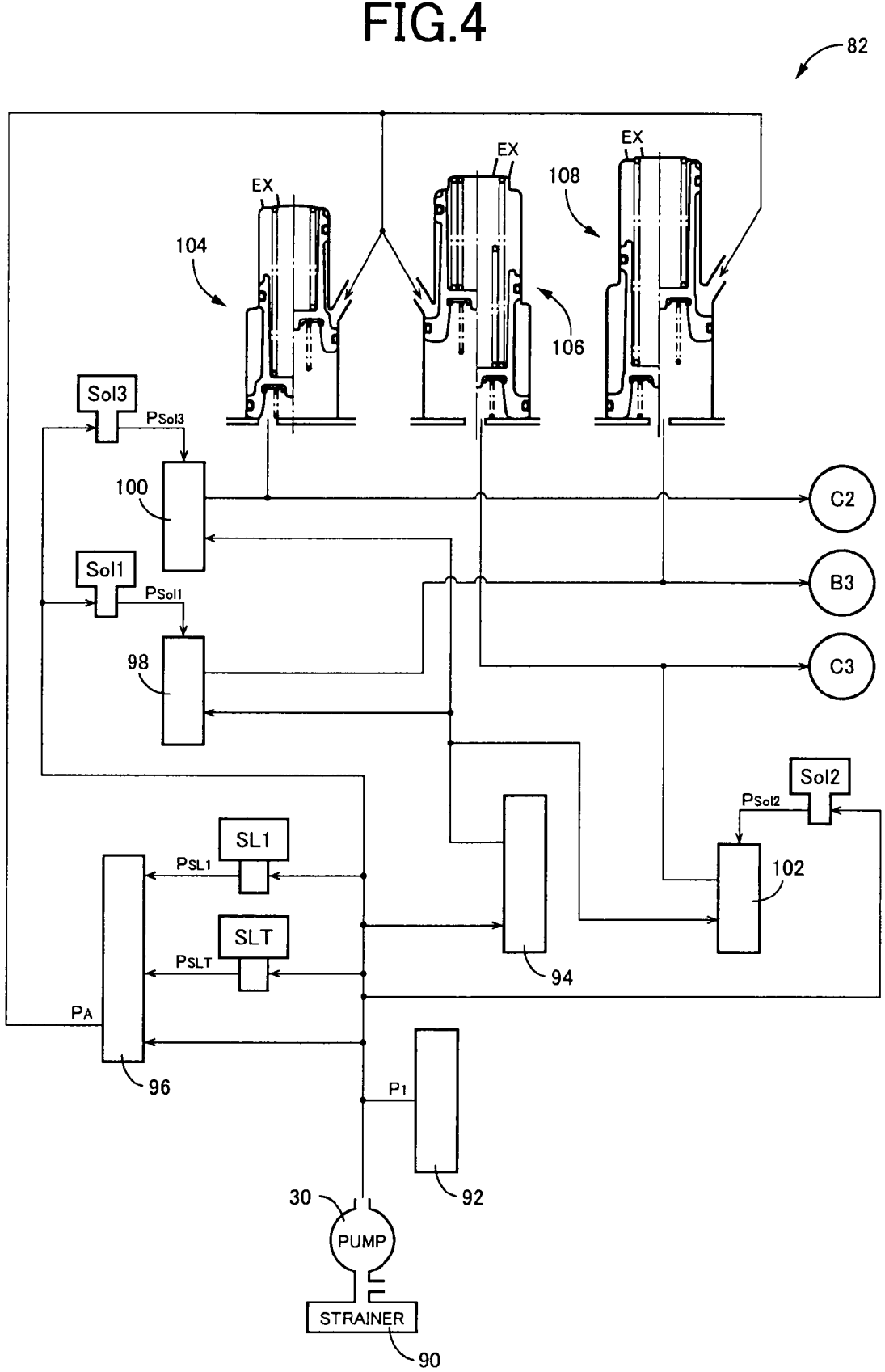
FIG. 4 is a view exemplarily showing a part of a structure of a hydraulic control circuit incorporated in the drive-force transfer device shown in FIG. 1.

FIG. 4 is a view exemplarily showing a structure in part of the hydraulic control circuit 82. As shown in FIG. 4, the hydraulic control circuit 82 includes electromagnetic control valves such as, for instance, the solenoid valves Sol1 to Sol3 and the linear solenoid vales SL1 and SL2 or the like. In addition, the hydraulic control circuit 82 further includes the primary regulator valve 92, a manual valve 94, an accumulator control valve 96, a 1-2 shift valve 98, a 3-4 shift valve 100, a 2-3 and 5-6 shift valve 102, and first, second and third accumulator valves 104, 106 and 108.

With the hydraulic control circuit 82 shown in FIG. 4, the hydraulic pump 30 driven with the engine 12 under rotation, pumps working oil, recirculated to a strainer 90, at a given pressure level. The primary regulator valve 92 regulates the hydraulic pressure delivered from the hydraulic pump 30 as the original hydraulic pressure to the line pressure $P_{L1}$ for supply to the solenoid vales Sol1 to Sol3, the linear solenoid valves SL1 and SLT, the manual valve 94, and the accumulator control valve 96 or the like. In addition, the resulting line pressure $P_{L1}$ regulated by the primary regulator valve 92, is supplied to the 1-2 shift valve 98, the 3-4 shift valve 100 and the 2-3 and 5-6 shift valve 102.

The accumulator control valve 96 receives the line pressure $P_{L1}$ delivered from the primary regulator valve 92 as the original hydraulic pressure, to provide a regulated accumulator pressure $P_A$ in response to control pressures $P_{SL1}$ and $P_{SLT}$ delivered form the linear solenoid valves SL1 and SLT. The accumulator pressure $P_A$ is then supplied to the first, second and third accumulators 96, 98 and 100 as a backpressure. With the hydraulic control circuit 82 of the present embodiment, the accumulator control valve 94 (associated with the linear solenoid valves SL1 and SLT) controls the backpressure supplied to the first to third accumulators 104, 106 and 108 in an integrated fashion.

The 1-2 shift valve 98 switches between the supply and non-supply (block) of the hydraulic pressure (line pressure $P_{L1}$) delivered from the manual valve 94 to the third brake B3 (and the third accumulator 108), in response to a control pressure $P_{Sol1}$ delivered from the solenoid valve Sol1. Further, the 3-4 shift valve 100 switches between the supply and non-supply (block) of the hydraulic pressure, delivered from the manual valve 94 to the second clutch C2 (and the first accumulator 104), in response to a control pressure $P_{Sol3}$ delivered from the solenoid valve Sol3. Furthermore, the 2-3 and 5-6 shift valve 102 switches between the supply and non-supply (block) of the hydraulic pressure, delivered from the manual valve 94, to the third clutch C3 (and the second accumulator 106) in response to a control pressure $P_{Sol2}$ delivered from the solenoid valve Sol2.

As shown in FIG. 4, the first accumulator 104 is provided in line with the second clutch C2 to accumulate the hydraulic pressure delivered from the 3-4 shift valve 100, which is also supplied to the second clutch C2. Further, the second accumulator 106 is provided in line with the third clutch C3 to accumulate the hydraulic pressure, delivered from the 2-3 and 5-6 shift valve 102, which is also supplied to the third clutch C3.

The third accumulator 108 is provided in line with the third brake B3 to accumulate the hydraulic pressure, delivered from the 1-2 shift valve 98, which is also supplied to the third brake B3. With such a structure, controlling the backpressures of the accumulators results in controls of gearshift transition hydraulic pressures of the hydraulically operated frictional engaging devices associated with such accumulators, respectively. In other words, this results in control of time between a start of supplying the hydraulic pressure to each hydraulically operated frictional engaging device for engagement thereof and the completion of the hydraulically operated frictional engaging device being engaged.

Figure 5:
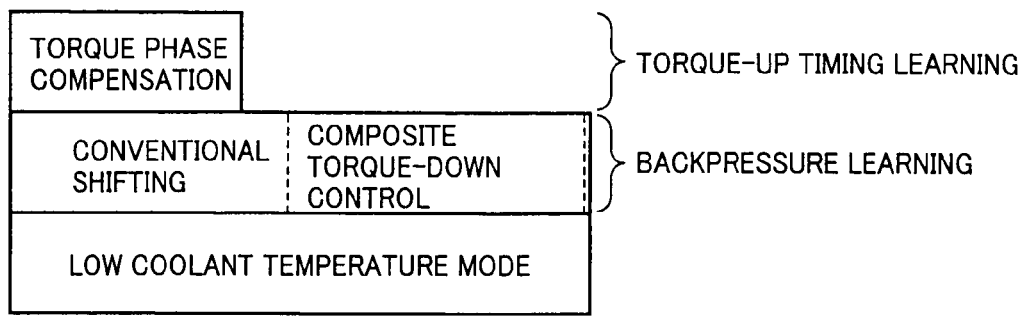
FIG. 5 is a view illustrating how a control in the present embodiment is positioned in contrast to that of the prior art.

FIG. 5 is a view illustrating a positioning layout in control to be executed in the present embodiment in comparison to that of the conventional art. As shown in FIG. 5, the electronic control unit 80 incorporated in the drive-force transfer device 10 of the present embodiment, executes various composite controls. These involve a torque-down control, effective to smoothly engage the hydraulically operated frictional engaging devices, which is executed in the gearshift operation of the conventional art; an accumulator backpressure control; and a learning control. In addition, the composite controls further include a gearshift control executed in a low coolant temperature mode; a torque compensation control (on-gearshift torque-up control); and a related torque-up timing learning control or the like. Hereunder, the gearshift control of the electronic control unit 80 will be described in detail with reference to timing charts shown in FIGS. 7 to 10.

Figure 6:
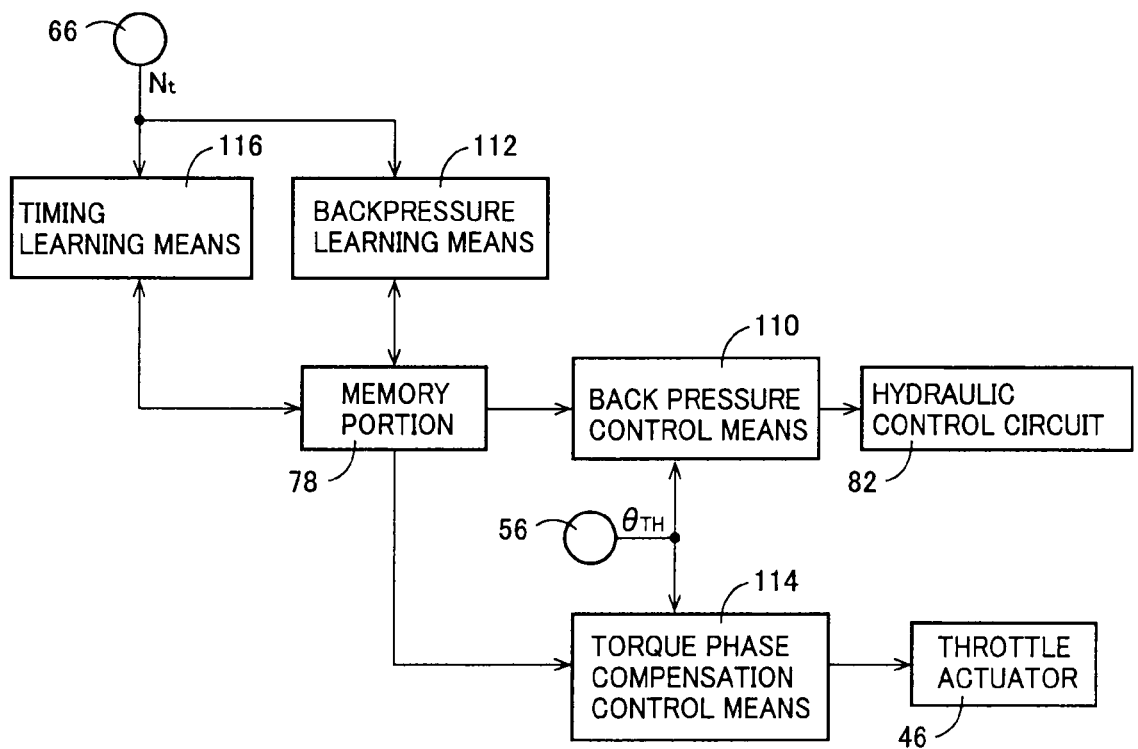
FIG. 6 is a functional block diagram illustrating a major control function provided in an electronic control unit shown in FIG. 3.

FIG. 6 is a functional block diagram illustrating a major control function to be executed by the electronic control unit 80. As shown in FIG. 6, the drive-force transfer device 10 has a storage section 78, such as a RAM or the like, for permitting the electronic control unit 80 to perform write-in or read-out of information. The storage section 78 may take the form of a structure replaced by a RAM or the like incorporated in the electronic control unit 80.

Back pressure control means 110, shown in FIG. 6, controls the backpressure to be applied to the accumulators 104, 106 and 108 by the linear solenoid valves SL1 and SLT incorporated in the hydraulic control circuit 82. More particularly, controlling excitation currents of the linear solenoid valves SL1 and SLT results in control of the control pressures $P_{SL1}$ and $P_{SLT}$ output from the linear solenoid valves SL1 and SLT. This enables the accumulator pressure $P_A$, output from the accumulator control valve 96, to be controlled.

The control of the accumulator pressure $P_A$ is executed during the operation of the automatic transmission 16 in performing the gearshift operation involved in the engagements of the hydraulically operated frictional engaging devices (such as the second clutch C2, the third clutch C3 and the third brake B3) associated with the accumulators 104, 106 and 108. The backpressure control means 110 preferably executes the backpressure control (control of the accumulator pressure $P_A$) for the accumulators 104, 106 and 108 prior to the relevant gearshift output. That is, such a backpressure control may be solely executed at timing in the absence of the relationship with the gearshift output.

Backpressure learning means 112 executes learning on the backpressure control executed by the backpressure control means 110. For instance, learning on the backpressure control, executed by the backpressure control means 110, is performed so as to cause a variation in turbine rotation speed $N_t$ to converge on a predetermined given range. The variation in turbine rotation speed $N_t$ is targeted on a time period from the beginning of an inertia phase to the end of the same during the gearshift operation of the automatic transmission 16. The gearshift operation is accomplished upon engagements of the hydraulically operated frictional engaging devices (such as the second clutch C2, the third clutch C3 and the third brake B3) associated with the accumulators 104, 106 and 108.

Preferably, the converging range of the variation in turbine rotation speed $N_t$ is preliminarily determined to a value depending on the throttle opening $\theta_{TH}$, corresponding to the depressing stroke of the accelerator pedal 42 for immediately and smoothly engaging the hydraulically operated frictional engaging devices. At a given throttle opening $\theta_{TH}$, preferably, the backpressure learning means 112 executes learning on the backpressure control executed by the backpressure control means 110. This allows the variation in turbine rotation speed $N_t$, occurring in the time period from the beginning of the inertia phase to the end of the same during the gearshift operation of the automatic transmission 16, to converge on the given range predetermined in accordance with the given throttle opening $\theta_{TH}$.

More particularly, when the backpressure control means 110 executes the backpressure control, the storage section 78 stores the variation in turbine rotation speed $N_t$, resulting from such backpressure control, which is detected by the turbine rotation speed sensor 66. In a subsequent control, the backpressure control is executed so as to cause the variation in turbine rotation speed $N_t$ to converge on the converging range based on the variation stored in the storage section 78. Further, with such learning completed in operation, that is, when the variation in turbine rotation speed $N_t$, appearing during the gearshift operation of the automatic transmission 16, falls in the converging range, the storage section 78 stores a backpressure learning completion determining value in the form of flag.

Torque phase compensation control means 114 executes a torque phase compensation control (torque-up control) for raising torque, output from the engine 12, during an up-shift operation of the automatic transmission 16. In particular, for the purpose of minimizing a pull-in of a torque phase, i.e., a drop in substantive transfer torque in the up-shift operation of the automatic transmission 16, the throttle actuator 46 is activated at timing in line with such a pull-in, thereby controlling an opening $\theta_{TH}$ of the electronic throttle valve 48. This causes torque output from the engine 12 to increase at a given rate. An increment in engine torque for the torque phase compensation control may be preferably determined depending on the throttle opening $\theta_{TH}$ associated with the depressing stroke of the accelerator pedal 42 so as to achieve a necessary and sufficient reduction in pull-in of the torque phase.

With the given throttle opening $\theta_{TH}$, the torque phase compensation control means 114 may preferably execute such a control as described below. That is, at time when the determination is made that the torque phase begins during the gearshift operation of the automatic transmission 16, such a control is executed so as to increase output torque of the engine 12 by an increment corresponding to the throttle opening $\theta_{TH}$. In addition, the control is executed so as to cancel such a torque-up operation at time when the determination is made that the inertia phase begins.

Further, such a torque phase compensation control is executed when a given torque phase compensation executing condition is satisfied. In contrast, no torque phase compensation control is executed, when the opening $\theta_{TH}$ of the electronic throttle valve 48 already lies at an increased level, or when the accelerator pedal 42 is further depressed or retreaded.

Timing learning means 116 executes learning on the torque phase compensation control executed by the torque phase compensation control means 114. For instance, the timing learning means 116 learns timing at which the torque-up control begins, such that the torque-up control is started in line with the torque phase during the gearshift operation of the automatic transmission 16.

More particularly, when the torque phase compensation control means 114 executes the torque phase compensation control, the storage section 78 stores start timing (an elapse time in which the inertia phase begins after a shift command is output) of the inertia phase. The inertia phase is determined based on the turbine rotation speed $N_t$ detected by the turbine rotation speed sensor 66 in line with the torque phase compensation control, or a variation thereof. In a subsequent control, the start timing of the torque phase associated with the inertia phase is estimated based on start timing of the inertia phase stored in the storage section 78. Then, the torque-up control is performed such that start timing of the pull-in of torque (drop-in of torque) of torque associated with the inertia phase is nearly brought into coincidence with start timing of the torque-up control.

The electronic control unit 80 of the present embodiment executes the backpressure learning in priority to the torque-up timing learning. More particularly, if the determination is made that learning on the backpressure learning means 112 is not completed, that is, no backpressure learning completion determining value is stored in the storage section 78, the backpressure learning means 112 executes learning on the backpressure control. In this case, no torque-up control is executed in the torque phase compensation control means 114. In contrast, if the determination is made that learning of the backpressure learning means 112 is completed, then, the torque phase compensation control means 114 executes the torque phase compensation control (torque-up control), and the timing learning means 116 executes learning on the torque-up timing.

Further, preferably, once completion of learning of the backpressure learning means 112 is determined, the torque phase compensation control means 114 executes the torque phase compensation control, and the timing learning means 116 executes torque-up timing learning. Even under such operations, completion of learning on the backpressure control is determined during the gearshift operation with the execution of the torque-up control. If inadequate completion of learning on the backpressure control is determined due to an adverse affect resulting from the torque-up control, a subsequent control is executed in a manner described below. That is, the backpressure learning means 112 executes learning on the backpressure control again with non-executions of the torque phase compensation control of the torque phase compensation control means 114 and learning of the timing learning means 116.

Figure 7:
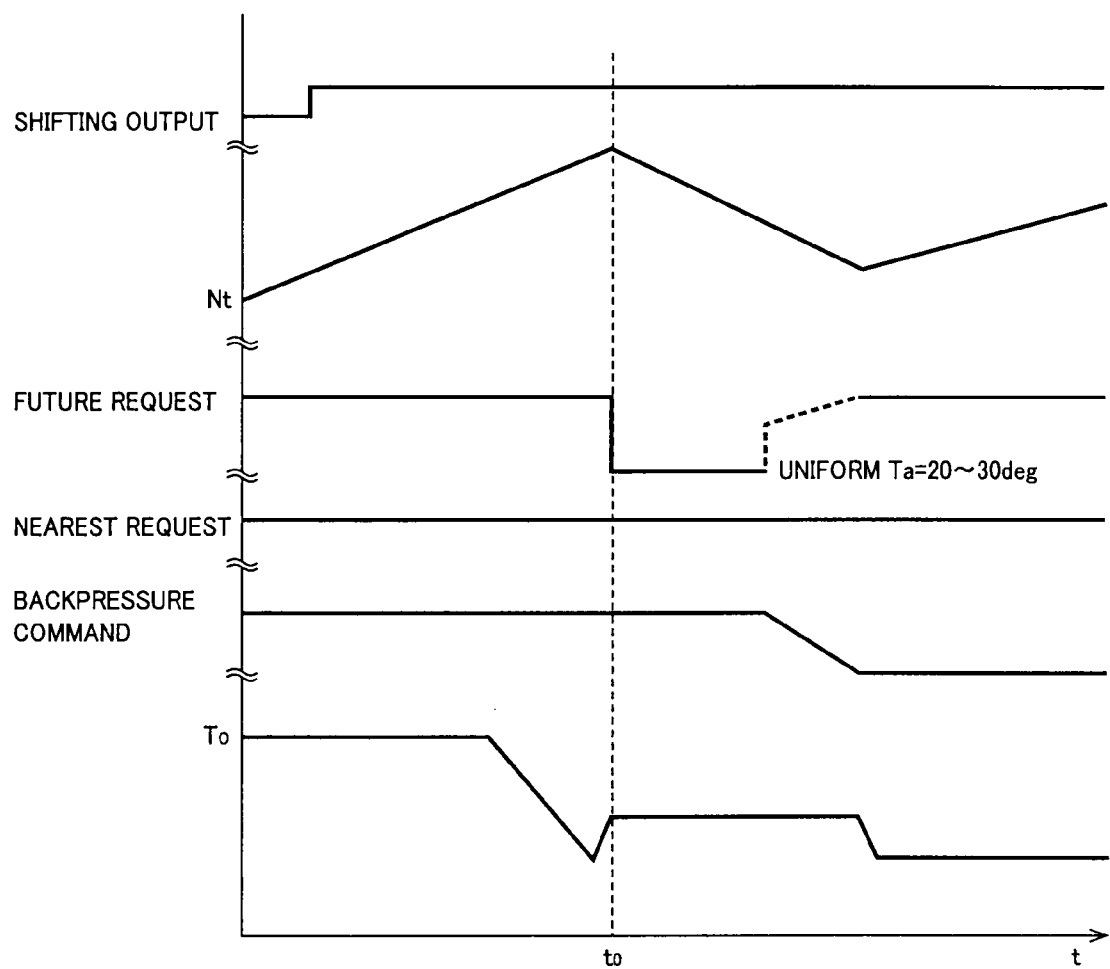
FIG. 7 is a timing chart exemplarily showing variation in times of various related values when performing a power-on upshift control in the automatic transmission shown in FIG. 1 during a retard angle disabling state.

FIG. 7 is a timing chart exemplarily showing variations in time in various related values occurring during the operation of the automatic transmission 16 to perform a power-on upshift control under a retard angle disabling state (at a low coolant temperature). As shown in FIG. 7, during a power-on upshift operation under the retard angle disabling state, no nearest request, i.e., no engine torque correction request for the current gearshift operation is initiated. Further, in a future request, i.e., an engine torque correction request for a subsequent gearshift operation, the throttle actuator 46 is controlled so as to allow the electronic throttle valve 48 to have an opening $\theta_{TH}$ laying at a unified value $T_A$ (=20 to 30 degrees). This causes engine torque $N_t$ to decrease to a constant value until a given time elapses from an inertia phase start time point $t_0$.

Figure 8:
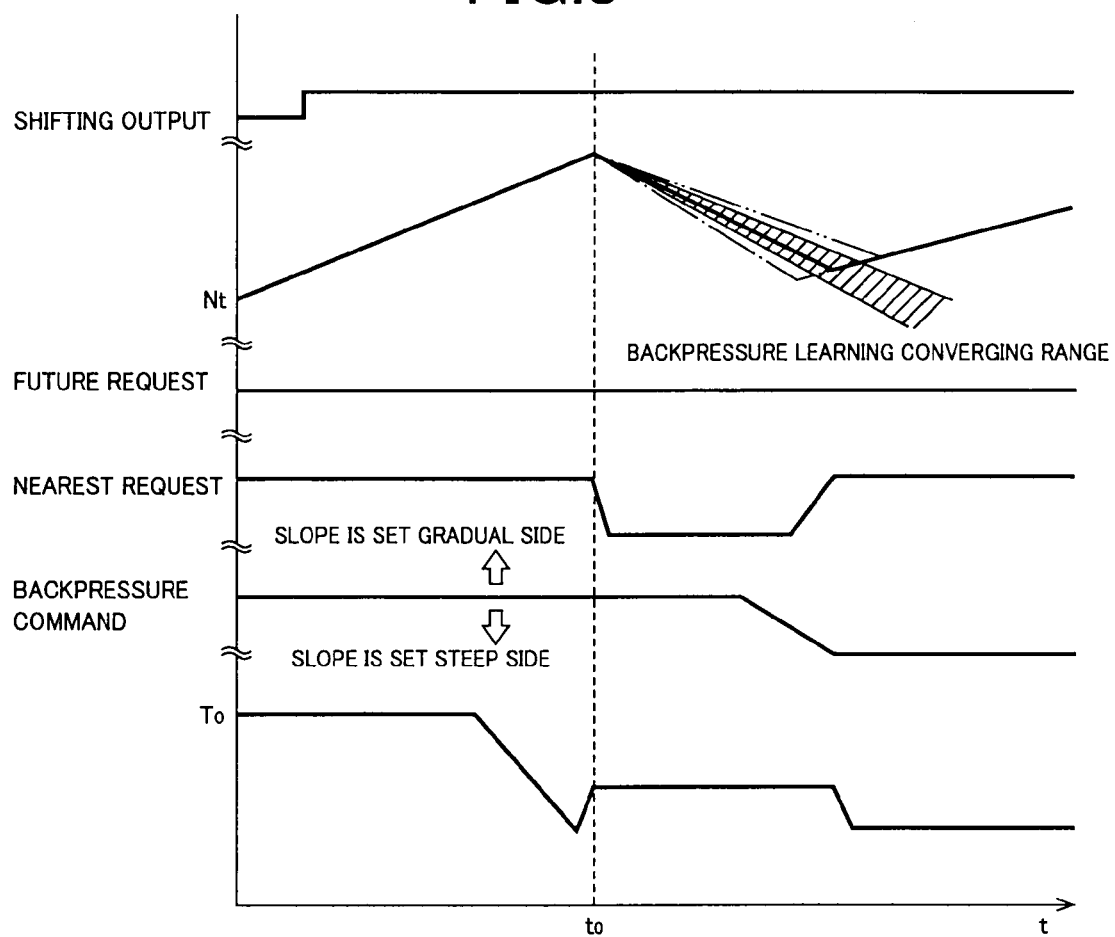
FIG. 8 is a timing chart exemplarily showing variation in times of various related values when performing the power-on upshift control in the automatic transmission shown in FIG. 1 during a normal gearshift mode with the retard angle disabling being released.

FIG. 8 is a timing chart exemplarily showing variations in time in various related values occurring during the operation of the automatic transmission 16 to perform the power-on upshift control, under a normal shift mode with the retard angle disabling state being cancelled. As shown in FIG. 8, during a normal power-on upshift mode, an engine torque correction request is output for decreasing the opening $\theta_{TH}$ of the electronic throttle valve 48 to a given value. This causes a reduction in engine torque to the constant value until the given time elapses from the inertia phase start time point $t_0$ in the nearest request. In addition, learning on the backpressure, i.e., the accumulator pressure $P_A$ supplied to the accumulator 104 or the like involved in the gearshift operation is executed.

For instance, learning on the backpressure control is executed such that the variation in turbine rotation speed $N_t$, present in time from the inertia start time point $t_0$ to the end thereof, converges on the predetermined given range (for instance, in an area indicated by a shaded portion). The variation in turbine rotation speed $N_t$, indicated by a solid line in FIG. 8, converges on a predetermined backpressure learning converging range, under which backpressure learning is completed and the backpressure control is stabilized.

On the contrary, if the variation in turbine rotation speed $N_t$, present on a thin single dot line as shown in FIG. 8, the variation in turbine rotation speed $N_t$ deviates from the backpressure learning converging range on a steeply sloped side. In this case, a subsequent control is executed so as to increase the accumulator pressure $P_A$ such that the turbine rotation speed $N_t$ varies on a further gradual slope.

Further, if the variation in turbine rotation speed $N_t$ is present in a manner as indicated by a thin double dot line in FIG. 8, the variation in turbine rotation speed $N_t$ deviates from the backpressure learning converging range to an area on a low-angle slope. Then, a subsequent control is executed so as to lower the accumulator pressure $P_A$ such that the turbine rotation speed $N_t$ varies at a further steeply sloped angle. Then, none of the torque phase compensation control and relevant learning is executed until learning on such a backpressure control is completed to cause the variation in turbine rotation speed $N_t$ to converge on the backpressure learning converging range.

Figure 9:
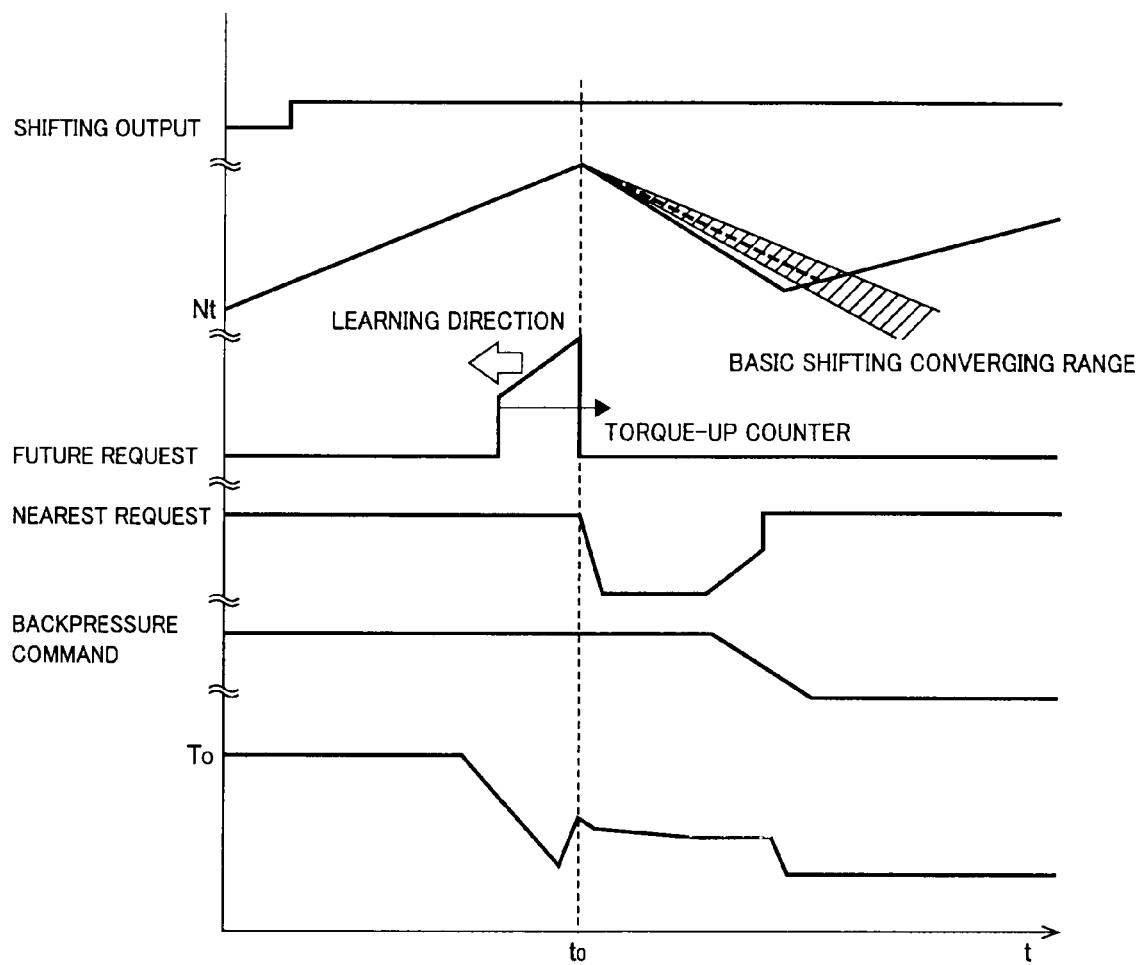
FIG. 9 is a timing chart exemplarily showing variation in times of various related values when performing the power-on upshift control in the automatic transmission shown in FIG. 1 during a torque-up timing learning mode.

FIG. 9 is a timing chart exemplarily showing variations in time in various related values occurring during the operation of the automatic transmission 16 to perform the power-on upshift control during a torque-up timing learning mode. As shown in FIG. 9, when the torque phase compensation control (torque-up control) is executed after the completion of the backpressure control learning, an engine torque correction request is output for increasing the opening $\theta_{TH}$ of the electronic throttle valve 48 by a given value. This causes engine torque to temporarily increase to a value in conformity to the pull-in of the torque phase on the future request.

Further, learning on start timing of the torque-up control is executed so as to perform the torque-up control in conformity to the pull-in of the torque phase. For instance, the start timing of the torque-up control is determined based on the variation in turbine rotation speed $N_t$, and a value (elapse time from the beginning of the torque-up control) of a torque-up counter appearing at such start timing is detected. If the value of such a torque-up counter is lower than a given value "a", then, in a subsequent control, learning on output timing of the engine torque correction request (torque-up request) in a future request is executed to cause the value of the torque-up counter to exceed the given value "a".

Here, backpressure learning appears to be inadequate with the progress of learning the torque phase compensation control. That is, the variation in turbine rotation speed $N_t$ deviates from the backpressure learning converging range as indicated by a solid line in FIG. 9. In a subsequent control, none of the torque phase compensation control and relevant learning is executed and learning on the backpressure control is re-executed. Then, the variation in turbine rotation speed $N_t$, occurring from the inertia phase start time point $t_0$ to the end thereof, converges on the backpressure learning converging range as indicated by a broken line in FIG. 9. In such a case, both the torque phase compensation control and relevant learning are resumed.

FIG. 10 is a timing chart exemplarily showing variations in time in various related values occurring during the operation of the automatic transmission 16 to perform the power-on upshift control, under a circumstance where respective learning on the backpressure control and the torque phase compensation control are stabilized after completion thereof. As shown in FIG. 10, with the backpressure control and the torque phase compensation control executed under stabilized states, the variation in turbine rotation speed $N_t$ in the inertia phase converges on the predetermined backpressure learning converging range. This allows the hydraulically operated frictional engaging devices, involved in the gearshift operation, to rapidly and smoothly engage.

Further, an adequate time interval is ensured from the beginning of the torque-up control executed in the torque phase compensation control, to the end (the beginning of the inertia phase) of the torque phase. This causes a reduction in the pull-in of the torque phase of output-shaft torque $T_O$ in the automatic transmission 16 (to a value lower than that achieved on a non-control mode indicated by a single dot line). Further, a torque-down control is executed after beginning of the inertia phase, gradually decreasing input torque applied to the automatic transmission 16. This causes the hydraulically operated frictional engaging devices, involved in the gearshift operation, to smoothly engage.

Thus, no interference occurs between respective leaning of the backpressure control and the torque phase compensation control. This enables the power-on upshift to be executed with the realization of a comfortable gearshift feeling, regardless of the presence of the execution/non-execution of the torque phase compensation control.

FIG. 11 is a flowchart illustrating one example of a major portion of the power-on upshift control, executed with the electronic control unit 80, which is repeatedly executed on a given cycle.

First in step (hereinafter the term "step" will be omitted) S1, a gearshift output is generated for switching a gearshift position of the automatic transmission 16. Next, in S2, turn-on of a backpressure learning completion determination is determined, that is, storage of a backpressure learning completion determining value is determined in the storage section 78. If the determination is made negative in S2, then, the operations subsequent to S9 will be executed. If the determination is made positive in S2, then, the operation is executed in S3 to determine whether or not the torque phase compensation executing condition is satisfied. This determination is executed based on the opening $\theta_{TH}$ of the electronic throttle valve 48 and the depressing stroke (accelerator-opening Acc) of the accelerator pedal 42, by referring to whether or not the torque phase compensation executing condition is satisfied, i.e., by referring to a predetermined relationship.

If the determination is made negative in S3, then, the operations subsequent to S9 will be executed. If the determination is made positive in S3, then, the torque phase compensation control is commenced in S4. That is, an engine torque correction request is output for increasing output torque of the engine 12. At the same time, further, the torque-up counter is caused to commence the calculation. In subsequent S5, the determination is made whether or not the inertia phase begins in the gearshift operation by referring to the turbine rotation speed $N_t$. At that time point, further, the torque-up control is cancelled.

Next, in S6 corresponding to the operation of the timing learning means 116, the start timing of the inertia phase determined in S5 is stored in the storage section 78, thereby executing learning on the start timing of the torque-up control. In succeeding S7, the determination is made whether or not the value of the torque-up counter exceeds the given value "a" and the variation in turbine rotation speed $N_t$ deviates from the backpressure (hydraulic pressure) learning converging range.

If the determination is made negative in S7, then, the current routine is completed. If the determination is made positive in S7, then, the operation in S8 is executed to alter the backpressure learning completion determining value with the backpressure learning regarded to be uncompleted, after which the current routine is terminated. In S9, the operation is executed to determine the start of the inertia phase in the gearshift operation by referring to the turbine rotation speed $N_t$. Then, in S10, the determination is made whether or not the variation in turbine rotation speed $N_t$ deviates from the backpressure (hydraulic pressure) learning converging range.

If the determination is made negative in S10, then, in S8, the storage section 78 stores the backpressure learning completion determining value representing the completion of the backpressure learning, after which the current routine is completed. In contrast, if the determination is made positive in S10, then, in S11 corresponding to the backpressure control means 110 and the backpressure learning means 112, learning on the backpressure control is executed so as to allow the variation in turbine rotation speed $N_t$ to converge on the backpressure learning converging range. Next, in S8, the backpressure learning completion determining value is altered with the backpressure learning regarded to be uncompleted, after which the current routine is terminated. In the foregoing controls, the operations in S4 and S5 correspond to the operation of the torque phase compensation control means 114.

With the present embodiment, the control device for vehicular automatic transmission includes the second and third clutches C2 and C3 and the third brake B3, serving as the hydraulically operated frictional engaging devices controlled in engagement with the hydraulic pressure, and the accumulators 104, 106 and 108. The accumulators 104, 106 and 108 control the hydraulic pressure supplied to the hydraulically operated frictional engaging devices. In performing the gearshift operation, the backpressure of the accumulators 104, 106 and 108 are controlled under the backpressure control, and the torque output of the engine 12 serving as the drive-force source is raised under the torque-up control.

With the control device for vehicular automatic transmission, the determination is made whether or not learning on the backpressure control is completed. If the determination is made that no learning on the backpressure control is completed, learning on the backpressure control is executed with no execution of the torque-up control. Thus, in performing the gearshift operation, executing learning on the backpressure control for the accumulators 104, 106 and 108 in priority avoids the occurrence of interference between steps of learning. That is, a control device for vehicular automatic transmission can be provided which, during the gearshift operation, can suppress the occurrence of interference between respective learning on the backpressure control for the accumulators 104, 106 and 108 and the torque-up control such that these controls are appropriately executed.

If the determination is made that learning on the backpressure control is completed, then, the torque-up control is executed with the execution of learning the torque-up control. With learning on the backpressure control being completed, the torque-up control and the relevant learning can be appropriately executed during the gearshift operation.

In performing the gearshift operation with the execution of the torque-up control, the determination is made whether or not learning on the backpressure control is completed. If the determination is made that no learning on the backpressure control is completed, then, learning on the backpressure control is executed with no execution of the torque-up control. Thus, even once the determination is made that learning on the backpressure control is completed, learning on the backpressure control is executed again when learning on the backpressure control is regarded to be inadequate with the progress of learning on the torque-up control. This enables the backpressure control and the torque-up control to be appropriately executed during the gearshift operation while suppressing the occurrence of interference between the steps of learning.

In the foregoing, while the present invention has been described above with reference to the preferred embodiment shown in the drawings, the present invention is not limited to such an embodiment and may be further implemented in various other modifications.

For instance, with the present embodiment, the drive-force transfer device 10 has been described with structure having the hydraulic control circuit 82 arranged to control the backpressure of the plural accumulators 104, 106 and 108 in an integrated fashion using the common accumulator pressure $P_A$. However, the present invention is not limited to such a structure but may be preferably applied to, for instance, a drive-force transfer device having a hydraulic control circuit arranged to discretely control the backpressure in line with the plurality of accumulators, respectively.

With the present embodiment, further, the backpressure learning means 112 has been described for a case to execute learning on the backpressure control so as to allow the variation in turbine rotation speed $N_t$ in the inertia phase to converge on the given range. However, such learning may be executed using other method based on other numeric value, provided that learning on the backpressure control of the accumulators is executed so as to rapidly and smoothly engage the hydraulically operated frictional devices involved in the gearshift operation. Further, the timing learning means 116 has been described for a mode in which learning on the torque-up start timing is executed so as to allow the value of the torque-up counter to be greater than the given value "a". However, such learning may be similarly executed using the other method based on the other numeric value.

Besides, although no description is made on every detail, the present invention can be implemented in various modifications without departing from the scope of the present invention.

What is claimed is:

1. A control device for a vehicular automatic transmission, wherein the vehicular automatic transmission comprises hydraulically operated frictional engaging devices whose engaging states are controlled with a hydraulic pressure, and accumulators for controlling the hydraulic pressure supplied to the hydraulically operated frictional engaging devices, during a gearshift operation, a backpressure control being executed for controlling a backpressure of the accumulators and a torque-up control being executed for raising a torque output from a drive-force source; and the control device is programmed to determine whether or not learning on the backpressure control is completed, and when no completion of learning on the backpressure control is determined, executes learning on the backpressure control with no execution of the torque-up control.

2. The control device for a vehicular automatic transmission according to claim 1, wherein the control device executes the torque-up control, when completion of learning on the backpressure control is determined while executing learning on the torque-up control.

3. The control device for a vehicular automatic transmission according to claim 2, wherein during the gearshift operation with the torque-up control being executed, the control device determines whether or not learning on the backpressure control is completed, and when no completion of learning on the backpressure control is determined, executes learning on the backpressure control again with no execution of the torque-up control.

4. The control device for a vehicular automatic transmission according to claim 1, wherein the control device determines completion of learning on the backpressure control, based on whether or not variation of a rotation speed of an input shaft of the automatic transmission converges within a predetermined range.

5. The control device for a vehicular automatic transmission according to claim 1, wherein the control device, upon a normal up-shift control, outputs an engine torque correction request for decreasing torque of the drive-force source.

6. The control device for a vehicular automatic transmission according to claim 1, wherein the control device, upon a normal up-shift control, executes learning on backpressure of the accumulator.

7. The control device for a vehicular automatic transmission according to claim 6, wherein the control device increases or decreases backpressure of the accumulator depending on weather a rotation speed of an input shaft of the automatic transmission is lower or higher than a predetermined range.

8. The control device for a vehicular automatic transmission according to claim 1, wherein the control device, upon execution of torque up after completion of the backpressure control learning, outputs engine torque correction request for temporarily increasing torque of the drive source.

9. The control device for a vehicular automatic transmission according to claim 1, wherein the control device, upon execution of torque up after completion of the backpressure control learning, executes learning on a start timing of the torque-up control.

10. The control device for a vehicular automatic transmission according to claim 1, wherein the control device includes a backpressure controlling portion controlling backpressure of the accumulator, a backpressure learning portion executing learning on the backpressure by the backpressure controlling portion, a torque phase compensation controlling portion executing the torque-up control for increasing torque of the drive source upon up-shifting by the automatic transmission, and a timing learning portion executing a torque phase compensation control by the torque phase compensation controlling portion.

* * * * *